(12) United States Patent
Morita

(10) Patent No.: US 8,190,603 B2
(45) Date of Patent: May 29, 2012

(54) INFORMATION PROVIDING SYSTEM, INFORMATION PROVIDING METHOD AND INFORMATION PROVIDING RECORD MEDIUM

(75) Inventor: Daisuke Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 12/196,816

(22) Filed: Aug. 22, 2008

(65) Prior Publication Data

US 2009/0083259 A1   Mar. 26, 2009

(30) Foreign Application Priority Data

Sep. 26, 2007   (JP) .................................. 2007-248455

(51) Int. Cl.
*G06F 17/30* (2006.01)
(52) U.S. Cl. ........................... 707/726; 707/728; 707/748
(58) Field of Classification Search .................. None
See application file for complete search history.

(56) References Cited

U.S. PATENT DOCUMENTS

| | | | | |
|---|---|---|---|---|
| 6,853,982 B2 * | 2/2005 | Smith et al. | ..................... | 705/27 |
| 7,295,995 B1 * | 11/2007 | York et al. | ..................... | 705/26 |
| 7,685,074 B2 * | 3/2010 | Linden et al. | ................. | 705/347 |
| 7,779,014 B2 * | 8/2010 | York et al. | ..................... | 707/748 |
| 7,881,984 B2 * | 2/2011 | Kane et al. | ................... | 705/26.7 |
| 7,945,485 B2 * | 5/2011 | Kane et al. | ................... | 705/26.7 |
| 7,966,334 B1 * | 6/2011 | Bezos et al. | .................. | 707/748 |
| 2005/0193002 A1 * | 9/2005 | Souders et al. | ........... | 707/103 X |
| 2011/0119150 A1 * | 5/2011 | Kane et al. | ................... | 705/26.7 |

FOREIGN PATENT DOCUMENTS

| | | |
|---|---|---|
| JP | 2000-242625 | 8/2000 |
| JP | 2001-092829 | 4/2001 |
| JP | 2002-123556 | 4/2002 |
| JP | 2002-366838 | 12/2002 |
| JP | 2003-281179 | 10/2003 |
| JP | 2004-171539 | 6/2004 |

OTHER PUBLICATIONS

Ishikawa Hiroshi, "Next-generation DB & data mining", Japan, CQPress Co.Ltd, (first version) May 1, 2005, pp. 84-102.
Japanese Office Action dated Aug. 18, 2009 for corresponding Japanese Patent Application 2007-248455.

* cited by examiner

*Primary Examiner* — Debbie Le
(74) *Attorney, Agent, or Firm* — Staas & Halsey LLP

(57) ABSTRACT

An information providing system which provides accumulated information items in compliance with requests has an association unit which totals access logs to the information items in each predetermined access unit. The association unit associates the plurality of information items accessed in the predetermined access unit as relevant information items. The information providing system also has an information providing unit which provides a requested information item when any of the plurality of information items associated by the association unit has been requested and which simultaneously provides any other information associated with the requested information or an access portion to the other information.

14 Claims, 15 Drawing Sheets

FIG. 2

| QUESTION CONTENTS | ANSWER CONTENTS | Q&A NOS. | SYSTEM ID | REFERENCE DATA AND HOUR INFORMATION |
|---|---|---|---|---|
| I CANNOT BE JOINED WITH INTERNET | COUNTERMEASURE METHOD IN CASE WHERE USER CANNOT BE CONNECTED WITH INTERNET | 1234-5678 | 0709111234578 | 07/09/11 17:03 |
| ... | ... | ... | ... | ... |

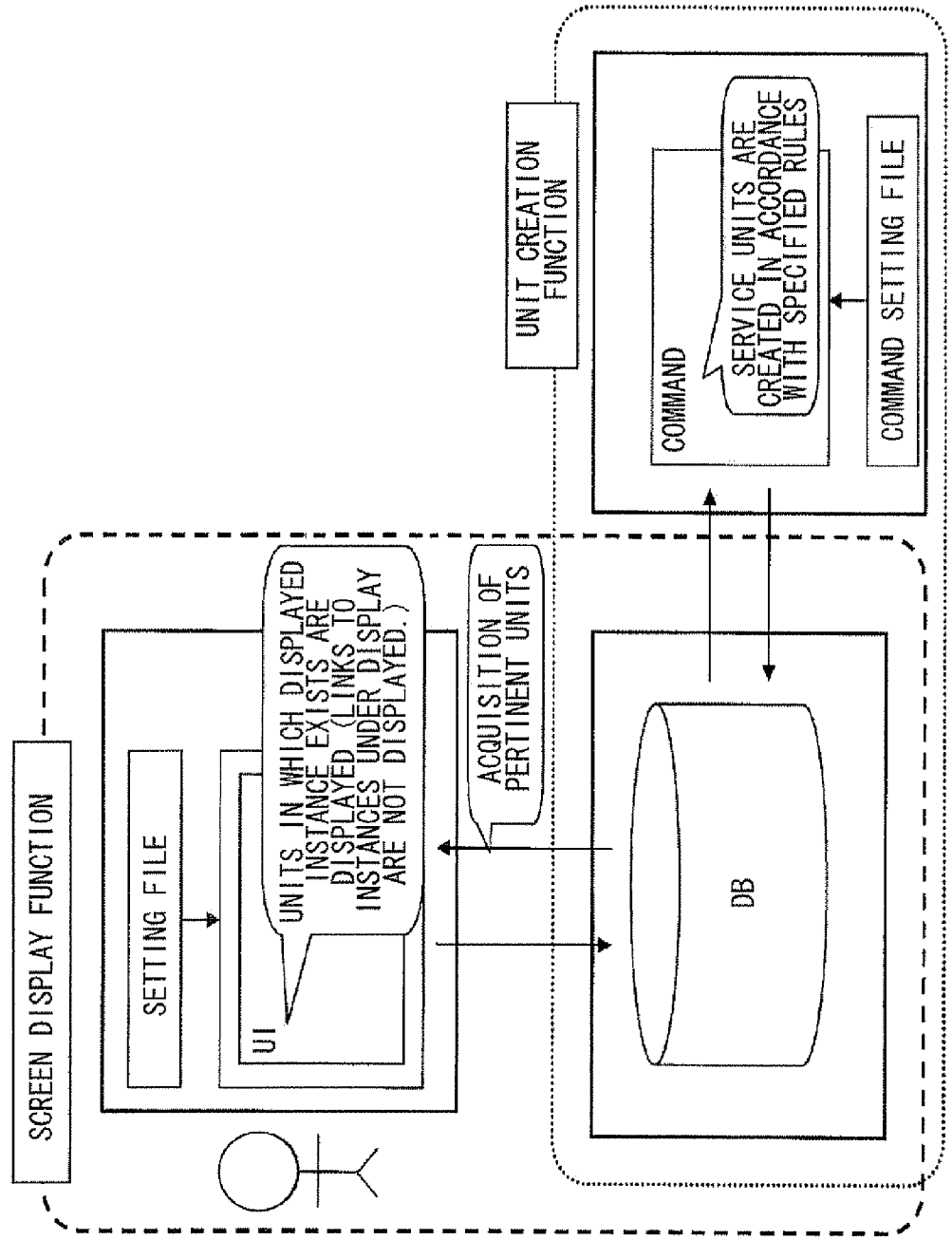

FIG. 7

[LOG-IN USER BASE]

| USER | INSTANCE |
|---|---|
| USER 1 | INSTANCE 1 |
| USER 1 | INSTANCE 2 |
| USER 1 | INSTANCE 1 |
| USER 2 | INSTANCE 1 |
| USER 2 | INSTANCE 3 |

| UNIT | Q&A CONTAINED IN UNIT |
|---|---|
| UNIT 1 | INSTANCE 1, INSTANCE 2 |
| UNIT 2 | INSTANCE 1, INSTANCE 3 |

※1 IN CASE WHERE IDENTICAL INSTANCE WAS REFERRED TO BY IDENTICAL USER (IN CASE WHERE IT WAS REPEATEDLY REFERRED TO), IT IS UNIQUEFIED.

[SESSION BASE]

| SESSION | INSTANCE |
|---|---|
| SESSION 1 | INSTANCE 1 |
| SESSION 1 | INSTANCE 2 |
| SESSION 1 | INSTANCE 3 |
| SESSION 2 | INSTANCE 4 |
| SESSION 2 | INSTANCE 5 |
| SESSION 2 | INSTANCE 5 |

| UNIT | Q&A CONTAINED IN UNIT |
|---|---|
| UNIT 1 | INSTANCE 1, INSTANCE 2, INSTANCE 3 |
| UNIT 2 | INSTANCE 4, INSTANCE 5 |

※2 IN CASE WHERE IDENTICAL INSTANCE WAS REFERRED TO IN IDENTICAL SESSION (IN CASE WHERE IT WAS REPEATEDLY REFERRED TO), IT IS UNIQUEFIED.

[UNIT INFORMATION]

| UNIT | NUMBER OF TIMES OF REFERENCE | NUMBER OF INSTANCES CONTAINED |
|---|---|---|
| 0000-0001, 0000-0002 | 3 | 2 |
| 0000-0001, 0000-0002, 0000-0003 | 2 | 3 |

[INTRA-UNIT INSTANCE INFORMATION]

| INSTANCE (Q&A NOS.) | NUMBER OF TIMES OF APPEARANCE |
|---|---|
| 0000-0001 | 2 |
| 0000-0002 | 2 |
| 0000-0003 | 1 |

INFORMATION PROVIDING SYSTEM, INFORMATION PROVIDING METHOD AND INFORMATION PROVIDING RECORD MEDIUM

CROSS-REFERENCE TO RELATED APPLICATIONS

This application is related to and claims priority to Japanese patent application No. 2007-248455, filed on Sep. 26, 2007 in the Japan Patent Office, the entire contents of which are incorporated by reference herein.

BACKGROUND OF THE INVENTION

1. Field of the Invention

The present system relates to an information providing system which provides accumulated information items in compliance with a request.

2. Description of the Related Art

There has heretofore been known a browsing aid information presenting method in which the analytical information items of link collection pages on the Internet are accumulated, the top URL of topics in which a Web page being referred to with a client terminal by a user is contained is decided from the URL of the Web page, and a link collection which is linked to the topic top URL is presented to the user.

There has also been a technique in which the access frequencies between Web pages are totaled, and files referred to indirectly are associated with each other. There has also been a technique in which pages accessed in a session are specified, and the utilization frequency of the pages or the reference branch likelihood between the pages is displayed on the basis of an access history. There has also been a technique in which regarding page link information items hit in a search, only links based on the keyword of the search are displayed in the order of popularity.

In a case where a user refers to information, he/she seeks the information for a particular reason (an appetite for knowledge, the occurrence of a trouble, or the like), and he/she thereafter performs such work as searching or tracing a link so as to display the information. Here, in a case where the user has failed to display the information sought in the first attempt, he/she needs to repeat the work of seeking the information, until he/she obtains the information sought.

In some cases, however, the user cannot hit the information sought, and he/she abandons the search for the information sought and stops seeking the information. Besides, even in a case where the user has succeeded in finding the information sought, he/she might have failed to obtain relevant information. Therefore, when the user encounters a new trouble or requires the relevant information, he/she sometimes has to seek the necessary information by repeating a search and an information display anew.

For this reason, there has heretofore been a technique for providing relevant information to users. In this technique, information items which are connected in contents or information items which should better be referred to in addition to information being currently referred to by the user are associated beforehand when an information provider creates the information items. The associated information items are then provided as the relevant information to the user.

It is laborious and difficult, however, for the information provider to grasp all of the relevancies among the information items and perform the work of the associations beforehand. Moreover, it is very difficult to grasp relevancies as to information items whose contents do not have clear relevancies or continuities. In some cases, the relevancies of contents are revealed during the service of information provision.

SUMMARY OF THE INVENTION

In view of the above problems, the present invention has for its object to provide users with other information items which are relevant to information items that the users want to obtain, but as to which the relevancies were not recognized beforehand at the creation of the information items.

The present system includes an information providing system in which accumulated information items are provided in compliance with a request, an association unit which totals access logs to the information items in each predetermined access unit, and which associates the plurality of information items accessed in the predetermined access unit as relevant information items, and an information providing unit which provides any of the plurality of information items associated by the association unit when the information has been requested, and which simultaneously provides the other information items associated with the requested information or access portions to the other information items.

The above-described embodiments of the present invention are intended as examples, and all embodiments of the present invention are not limited to including the features described above.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a diagram illustrating the schematic configuration of an instance database according to the embodiment;

FIG. 6 is a diagram illustrating the outline of the operation of the information providing system according to the embodiment;

FIG. 7 is a diagram illustrating examples of units according to the embodiment;

DETAILED DESCRIPTION OF THE PREFERRED EMBODIMENTS

Figure 1:
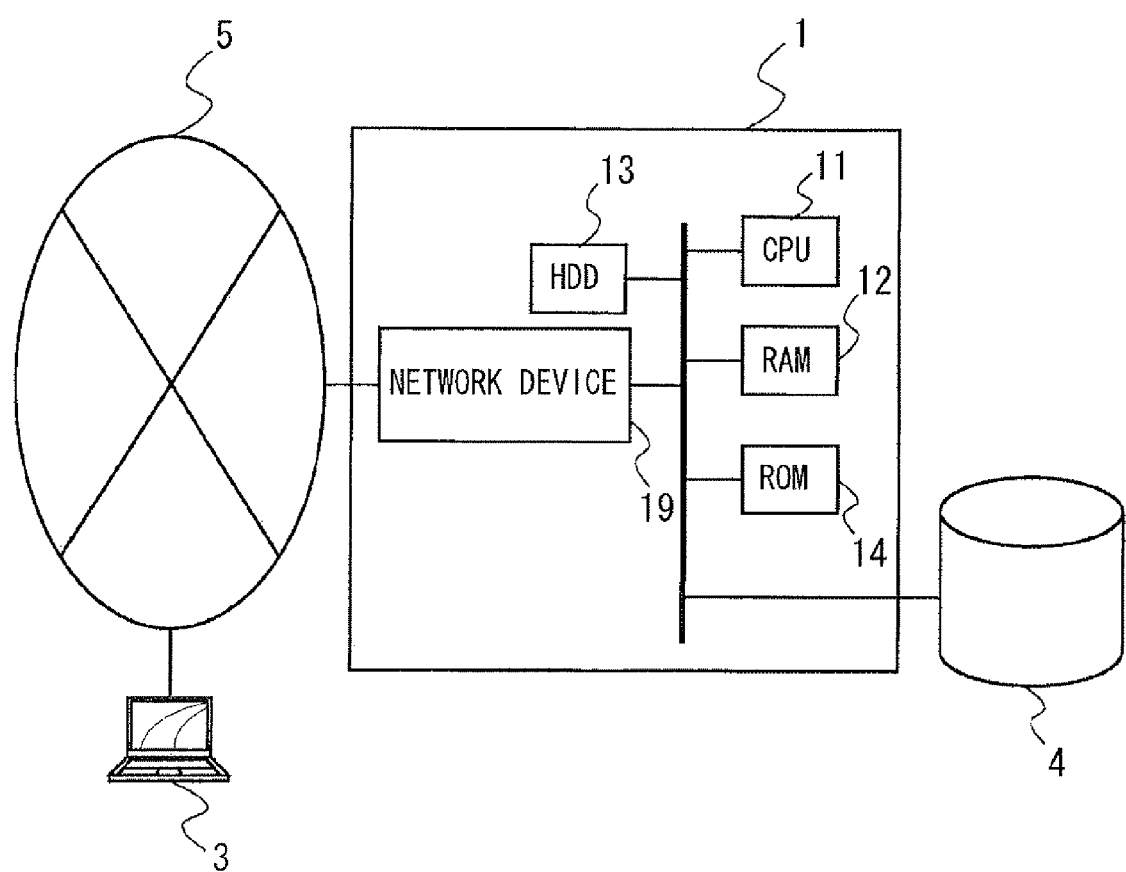
FIG. 1 is a diagram illustrating the outline of the hardware configuration of an information providing system in an embodiment of the present invention.

Reference may now be made in detail to embodiments of the present invention, examples of which are illustrated in the accompanying drawings, wherein like reference numerals refer to like elements throughout.

An embodiment of an information providing system will be described in conjunction with the drawings. FIG. 1 is a diagram showing the schematic configuration of the information providing system in the embodiment. The information providing system 1 is a computer which includes a CPU (Central Processing Unit) 11, a main storage device such as RAM (Random Access Memory) 12, an auxiliary storage device such as HDD (Hard Disk Drive) 13, a ROM (Read Only Memory) 14, and a network device 19.

An operating system (herein below, abbreviated to "OS") which serves to manage the computer, device drivers which serve to control devices included in the computer or connected to the computer, and various programs which are activated in the computer are installed in the HDD 13. The computer according to this embodiment operates as the information providing system 1 in such a way that the various programs (the OS, the device drivers, an information providing program, etc.) installed in the HDD 13 are expanded in the RAM 12, and the programs are interpreted and run by the CPU 11.

The information providing system 1 in this embodiment is disposed in a Web site which provides users with the support information items of personal computers. This information providing system 1 is connected to an instance database 4 in which instances are accumulated. Here, the "instances" are information items containing problems which the users want to solve, as well as events which the users encountered, and solving methods to cope with the problems, as well as the explanations of the events. In a case where the user refers to any instance by employing the information providing system 1, he/she accesses the information providing system 1 by using a user terminal 3, and he/she acquires the instance from the instance database 4 by, for example, tracing a link or making a search. The information providing system 1 reads out the instance corresponding to a user's request from the instance database 4 in compliance with the request transmitted from the user terminal 3 and received through a network 5. The information providing system 1 transmits the instance to the user terminal 3. The transmitted instance is received and displayed by the user terminal 3 via the network 5. However, the user sometimes fails to obtain the instance sought in the first attempt. In this case, the user needs to repeat the work of tracing links and/or the work of making searches, until he/she can obtain the instance sought.

FIG. 2 is a diagram showing the schematic configuration of the instance database 4 according to this embodiment. Each of the instances contains question contents, answer contents, Q&A Nos., a system ID, and reference date and hour information are accumulated in the instance database 4. Here, the question contents contain the problem which the user wants to solve, the event which was encountered by the user, or the like, in a text format. The answer contents contain the solving method corresponding to the question contents, the explanation of the event, or the like in the text format. That is, the user finds the problem to be solved or the encountered event by referring to the question contents, and he/she can solve the problem by referring to the corresponding answer contents. Besides, the Q&A Nos. are identification information which is provided to the user, and the system ID is identification information which the system uses in managing the instance. In addition, the reference date and hour information is information which indicates the date and hour when a system manager or an operator created the instance or updated the contents.

Figure 3:
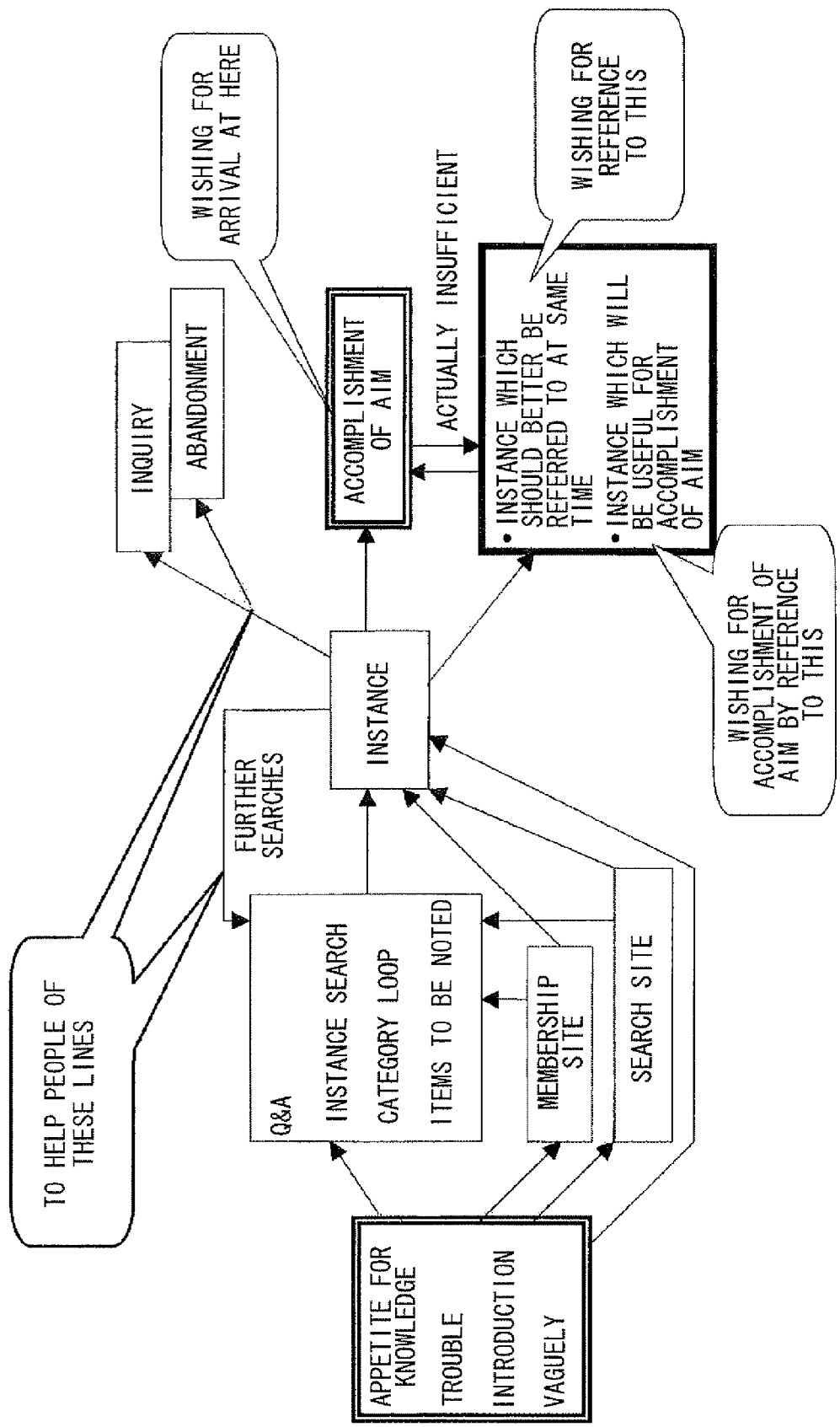
FIG. 3 is a diagram illustrating the purpose of providing relevant information by the information providing system in the embodiment.

FIG. 3 is a diagram showing purposes for which relevant information items are provided by the information providing system in this embodiment. In some cases, the user fails to find the instance sought, and he/she abandons the search for the instance sought by himself/herself and inquires of a support center by using electronic mail, telephone or the like. In consequence, a staff member at the support center copes with the problem which was solvable by referring to the information provided on the Web.

Besides, in most cases, when the user succeeds in obtaining the instance sought, he/she ends the work of seeking information, without further seeking the relevant information. However, an instance which should better be referred to in relation or an instance which will be useful in the future is sometimes existent in addition to the instance obtained by the user.

Therefore, the information providing system 1 according to this embodiment has the purpose of relieving the burden on the user who repeats the work of searching or tracing a link in order to find out the instance, providing the relevant information for arriving at an appropriate instance. The information providing system 1 according to this embodiment also has the purpose of relieving the burden on the user who abandons the search for the instance without finding it out, and providing the relevant information which should better be further referred to, to the user who has found out the instance sought.

Here, some instances in the instance database 4 have particular relevancies to one another. Among them, the instances whose contents have clear relations and the instance which should desirably be referred to in addition to reference to a certain instance can be associated by, for example, bestowing link information on the instances, at the time of the creation of the instances. In actuality, however, it is difficult to associate all the relevant instances on the basis of only the clear relevancies or continuities between the instances.

Figure 4:
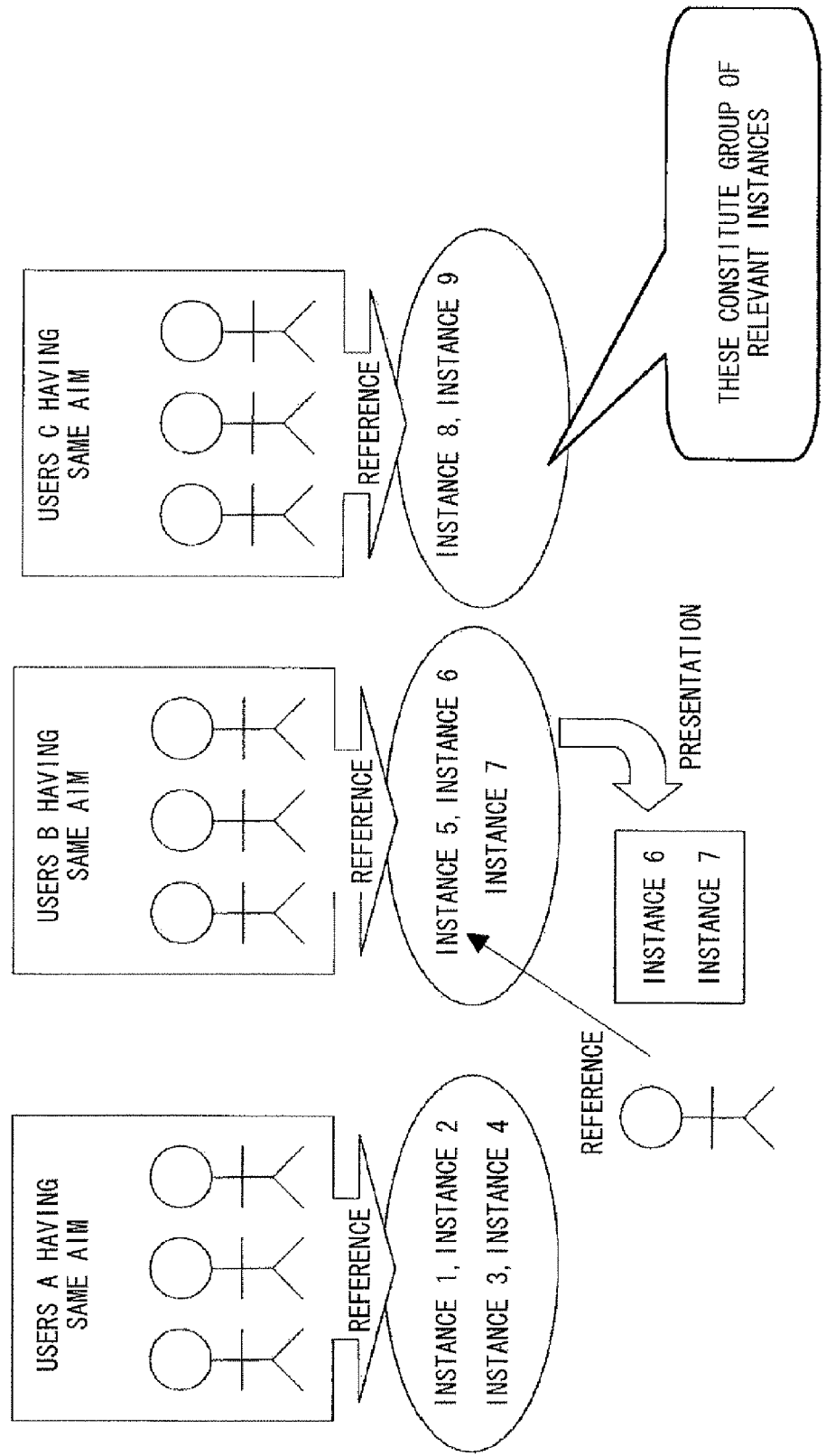
FIG. 4 is a diagram illustrating a method of associating instances in the embodiment.

FIG. 4 is a diagram showing a method of associating instances in this embodiment. For judging the relevancies between the instances, there is the above method in which the relevancies or continuities are judged on the basis of the contents of the instances. In this embodiment, however, a method is employed in which instances referred to by users having the same aim are determined as the relevant instances. The method judges the relevancy between the instances through service. In the system according to this embodiment, access logs, each of which contains, at least, the instance referred to by the user and the log-in ID or session ID of the user having referred to the instance are accumulated, and the access logs are totaled, whereby the relevancies between the instances are discovered.

Figure 5:
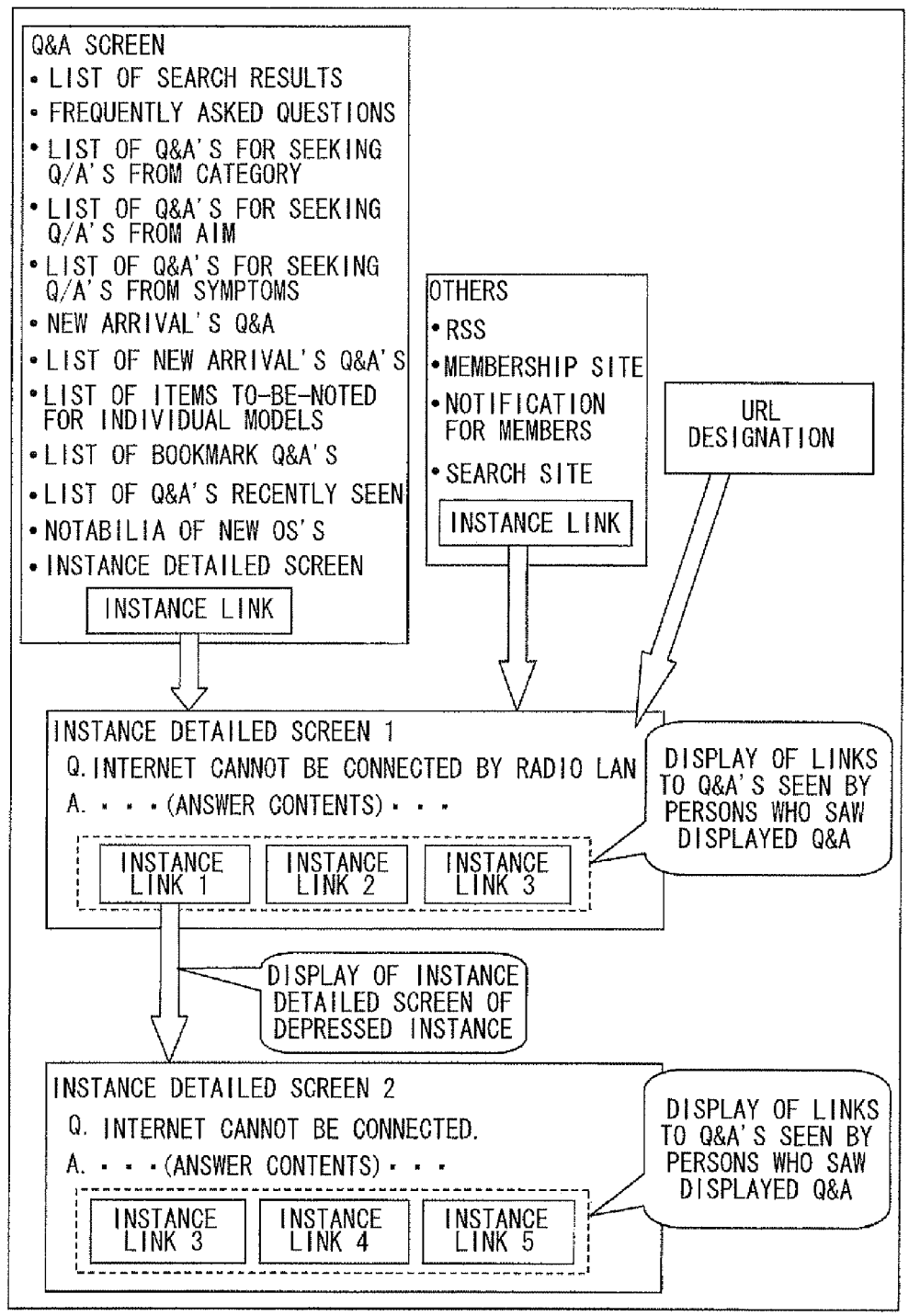
FIG. 5 is a diagram illustrating the outline of functions which are provided to users by the information providing system according to the embodiment.

FIG. 5 is a diagram showing the outline of functions which are provided to users by the information providing system according to this embodiment. The user selects an instance link which has been displayed by tracing links from a search function or a category display, thereby requesting an instance detailed screen. The information providing system 1 according to this embodiment presents the contents of a requested instance to the user, in the instance detailed screen requested by the user terminal 3. The information providing system 1 also presents links to other instances referred to by the users having the same aim (refer to links 1 to 3 in FIG. 5), to the user as relevant instances. Thus, the information providing system 1 provides the user with the instances which were omitted from the association at the time of the creation of the instances, but which are actually relevant, or the instances which have relevancies understood by only the user.

As a method which provides the relevant instances to the user, in this embodiment, the instance links which can be jumped to the contents of the relevant instances are displayed at the lower part of the instance detailed screen which displays the contents of the certain instance (refer to the "instance detailed screen 1" in FIG. 5). When the user selects the instance link by manipulating a mouse or a similar input device in the user terminal 3, the information providing system 1 is requested to transmit the detailed screen of the selected instance. An instance detailed screen 2 (refer to FIG. 5) is displayed in the user terminal 3 on the basis of display information transmitted by the information providing system 1.

Incidentally, also in the instance detailed screen displayed here, links to instances relevant to the instance currently displayed are displayed at the lower part of this screen. That is, the user can acquire the relevant instances by tracing the links in succession. By the way, although the links to the relevant instances are provided in this embodiment, access portions to the relevant instances other than the links may also be provided. Besides, the instance details of the relevant instances may also be provided simultaneously with the instance details of the instance requested by the user. In this case, the user can refer to the details of the relevant instances immediately without tracing the links.

FIG. 6 is a diagram showing the outline of the operation of the information providing system according to this embodiment. The information providing system 1 according to this embodiment totals access logs regularly in the background beforehand, thereby to extract relevant instances (unit creation process). The information providing system 1 retains the relevant instances in the database. In addition, when the user has made a request for a certain instance, the information providing system 1 acquires the relevant instances from the database, in addition to the instance requested by the user. The information providing system 1 provides the user with the portions (such as the links) for allowing the user to refer to the relevant instances.

FIG. 7 is a diagram showing examples of units according to this embodiment. In this embodiment, the "unit" signifies a group of instances which were referred to by an identical log-in user or in an identical session within a predetermined period. The information providing system 1 creates the units of log-in user base by extracting the access logs and totaling the instances referred to in user ID units. The information providing system 1 creates the units of session base by totaling the instances referred to in session ID units affixed to URL's.

Figure 8:
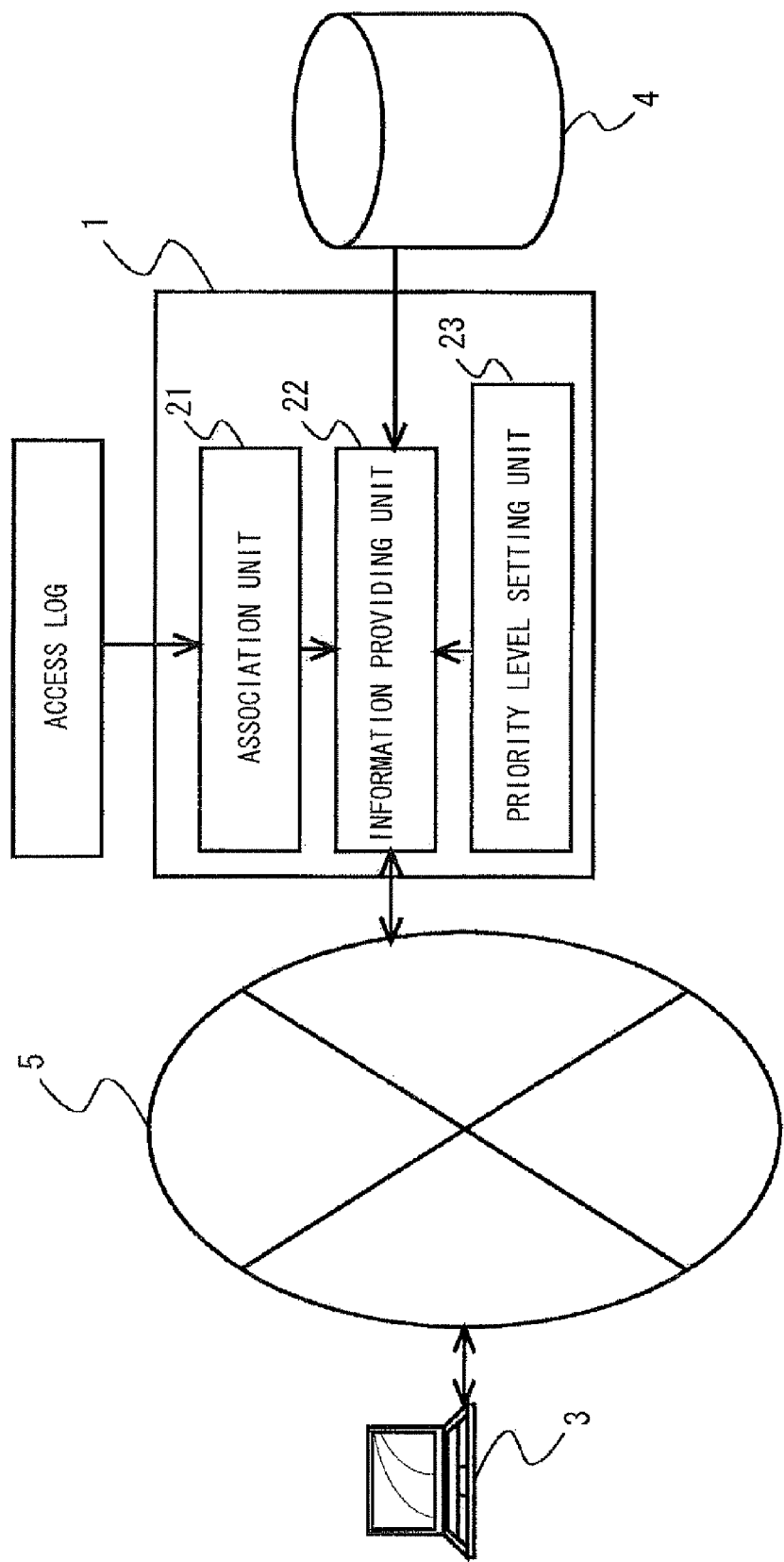
FIG. 8 is a diagram illustrating the outline of the functional configuration of the information providing system in the embodiment.

FIG. 8 is a diagram showing the outline of the functional configuration of the information providing system in this embodiment. The computer having the hardware configuration shown in FIG. 1 functions as the information providing system 1 which includes an association unit 21, an information providing unit 22 and a priority level setting unit 23, in such a way that the CPU 11 interprets and runs the various programs expanded in the RAM 12. In this regard, however, the functions which are executed by the information providing system 1 may well be individually or collectively realized by dedicated hardware elements.

The association unit 21 totals the access logs to the instances accumulated in the instance database 4, in log-in user units and in session units. The association unit 21 creates the units into each of which the plurality of instances accessed in the access units are grouped.

When any of the instances contained in each of the units created by the association unit 21 has been requested by the user terminal 3, the information providing unit 22 provides links to the other instances contained in the unit, simultaneously with the instance details of the requested instance. By the way, in this embodiment, the instance details and the links to the relevant instances are provided as display information of HTML (Hypertext Markup Language) document format, through the network 5.

The priority level setting unit 23 sets the priority levels of the created units and the priority levels of the instances within each unit in order that the relevant instances which are provided by the information providing unit 22 may be determined on the basis of the access logs.

Figure 9:
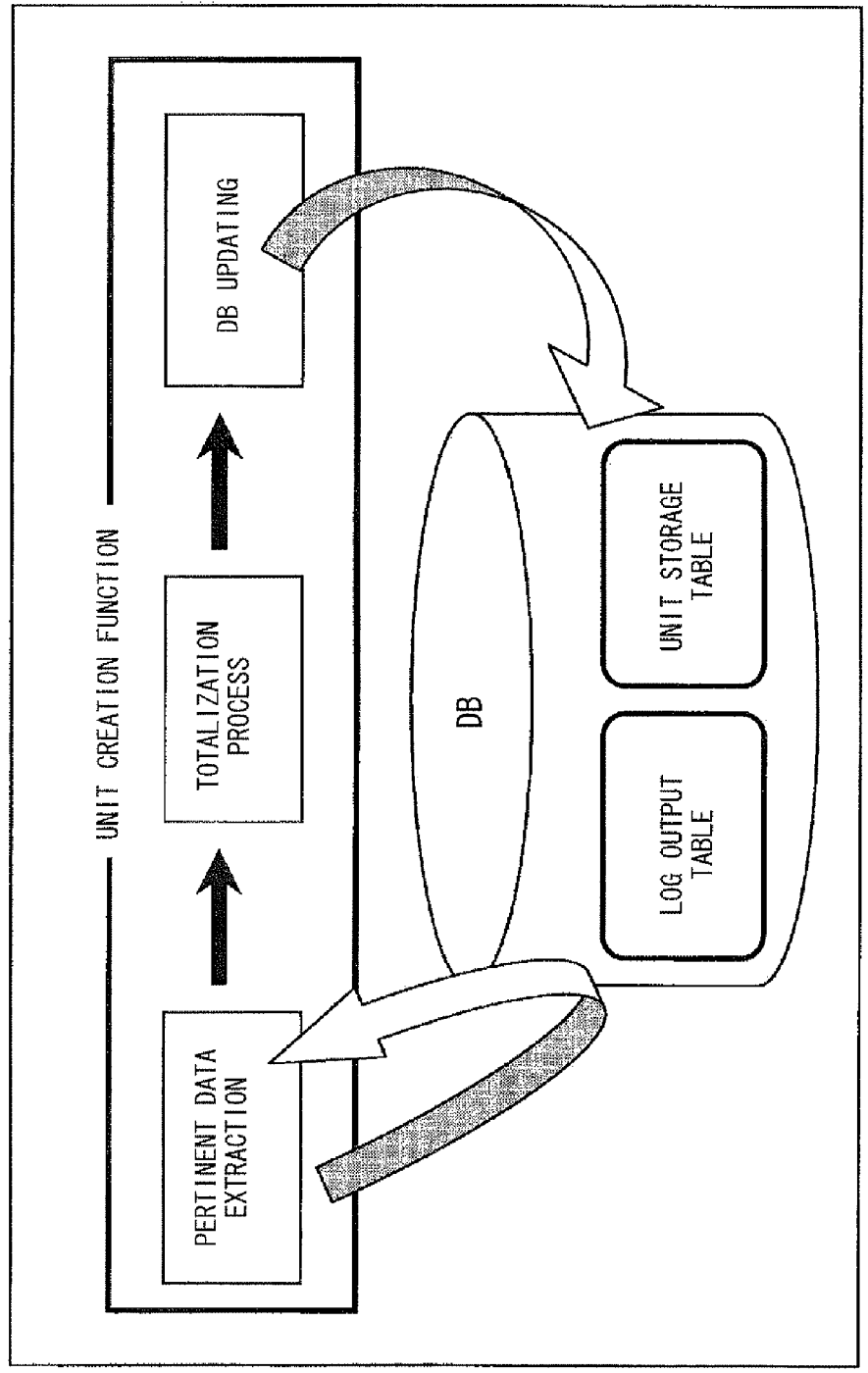
FIG. 9 is a diagram illustrating the outline of a unit creation process which is executed by the information providing system according to the embodiment.

FIG. 9 is a diagram showing the outline of the unit creation process which is executed by the information providing system 1 according to this embodiment. The unit creation process proceeds in the order of the extraction of pertinent data, tantalization, and database updating as a large flow. Besides, the unit creation process is a batch process which the information providing system 1 executes regularly in the background. The unit creation process is automatically executed, for example, when the time of the system becomes a preset time every day. The computer which operates as the information providing system 1 has the function of monitoring the current system time and executing the unit creation process when the current system time becomes the preset time (for example, the "chon demon" which is used in a UNIX (registered trademark) type system). The time of the automatic execution should preferably be set in, for example, a time zone in which accesses from users are small in number (at, for example, about 2 o'clock in the morning).

Figure 10:
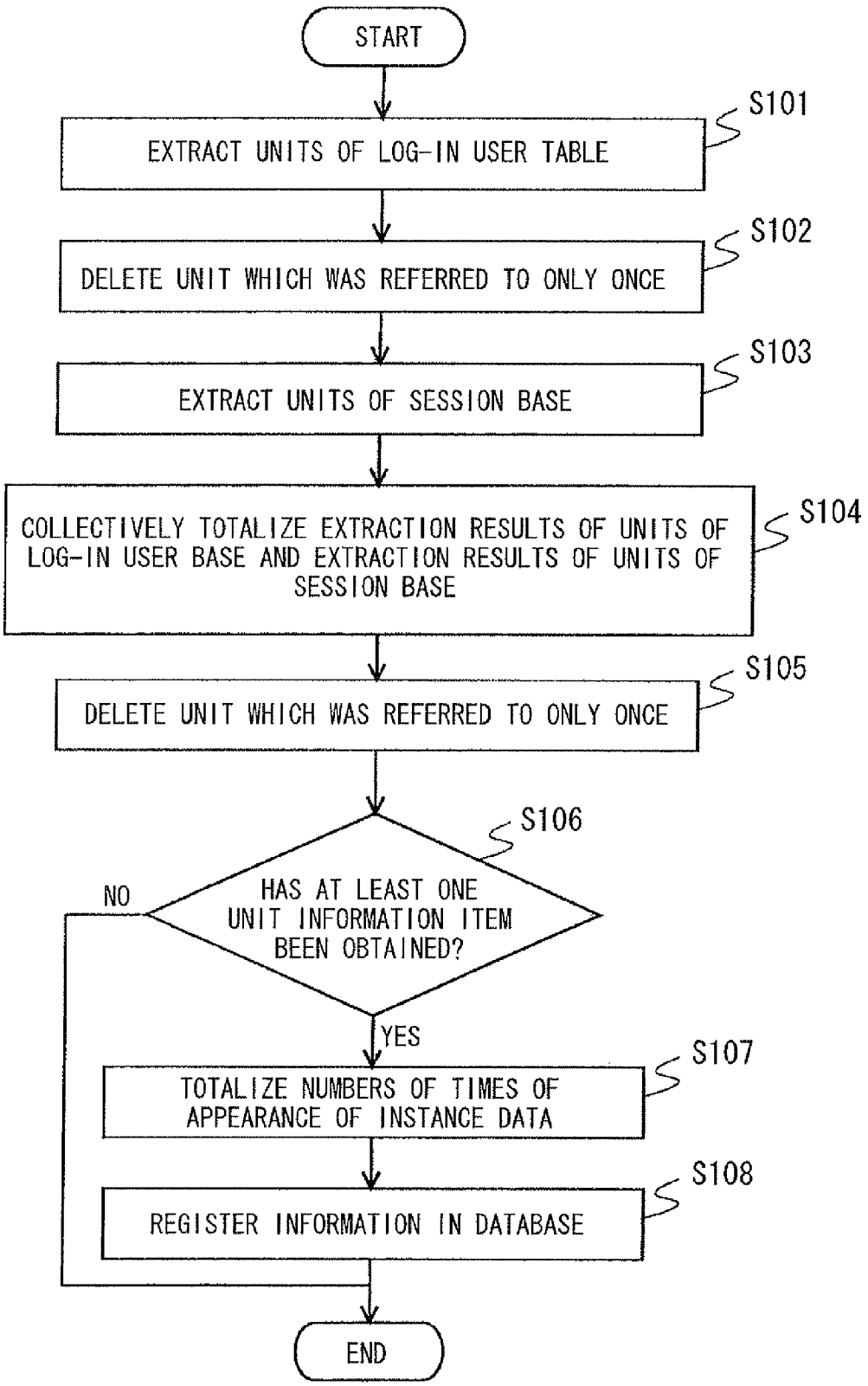
FIG. 10 is a flow chart illustrating the flow of the unit creation process in the embodiment.

FIG. 10 is a flow chart showing the flow of the unit creation process in this embodiment. The process shown in the flow chart is regularly executed in the background. By the way, in this embodiment, units are extracted in both the log-in user base and in the session base, and the units are totaled collectively. It is also allowed, however, to perform only either of the unit extraction of the log-in user base and the unit extraction of the session base, and to total only the units based on either of the extractions. Which of the unit extraction of the log-in user base and the unit extraction of the session base is adopted should preferably be appropriately selected depending upon each embodiment.

Figure 11:
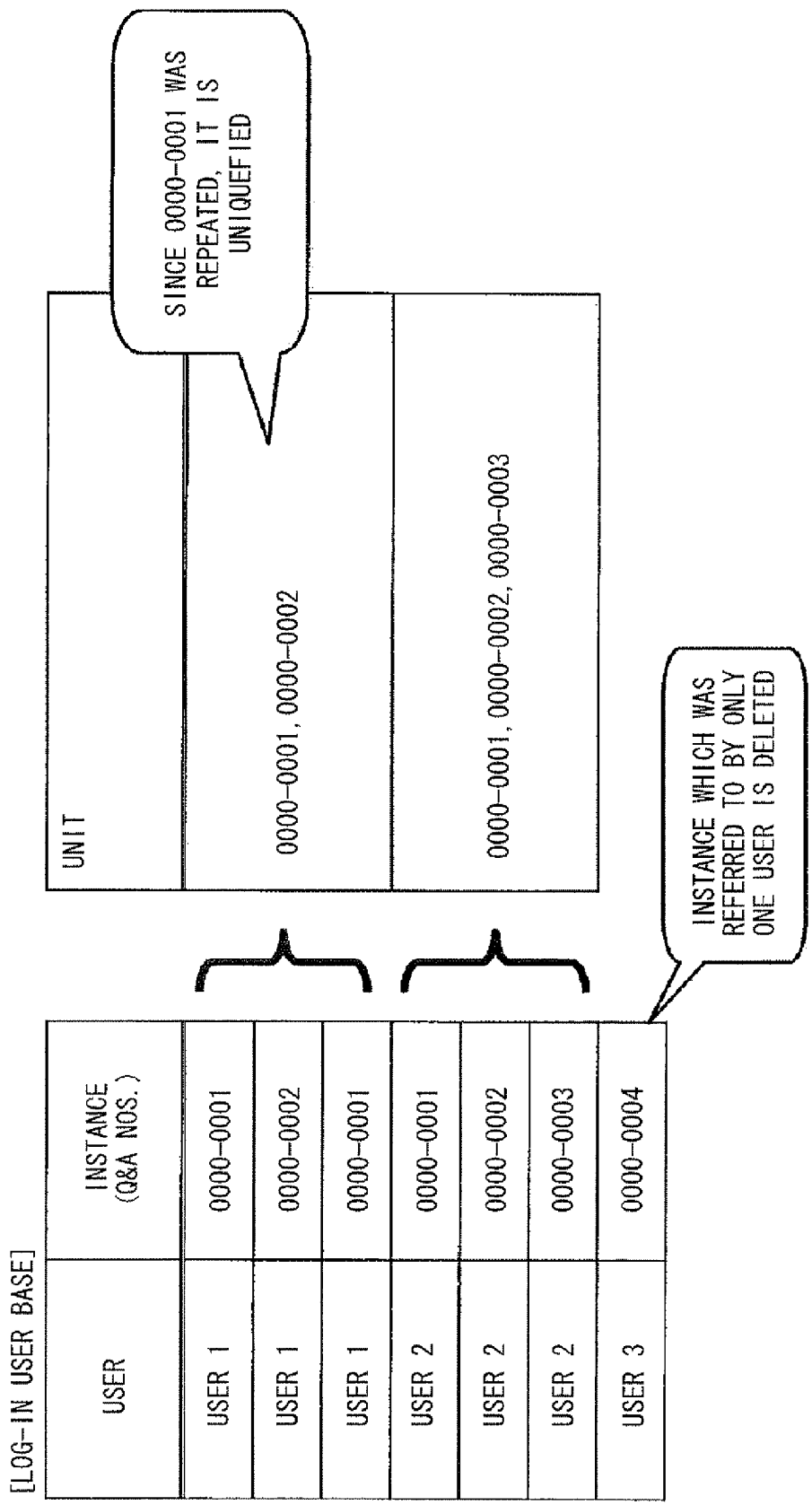
FIG. 11 is a diagram illustrating a unit extraction method of log-in user base in the embodiment.

At operation S101, the unit extraction of the log-in user base is performed. The association unit 21 reads out the access logs for 3 months before the time of the tantalization, from the database. Incidentally, any instance displayed by selecting a relevant instance link may well be excluded from the tantalization. In addition, the Q&A Nos. of instances referred to by an identical log-in user are extracted from the access logs read out, so as to put the instances together as a unit every log-in user. On this occasion, in a case where an identical instance was referred to a plurality of times by the identical log-in user, the identical instance referred to the plurality of times is unique-field when the instances are put together as the unit (refer to FIG. 11). The units extracted for the respective log-in users are once recorded in the RAM 12. Thereafter, the process advances to operation S102.

At operation S102, the units which were referred to only once are deleted. The association unit 21 refers to the list of the units extracted at operation S101. The association unit 21 deletes any unit as to which only one combination exists, that is, any unit which was referred to by only one log-in user (refer to FIG. 11). The unit which was referred to by only one log-in user is deleted, and the units which were referred to by two or more log-in users are left behind. In this way, the unit of low relevancy as was merely referred to by the identical log-in user accidentally can be prevented from being totaled. Thereafter, the process advances to operation S103.

Figure 12:
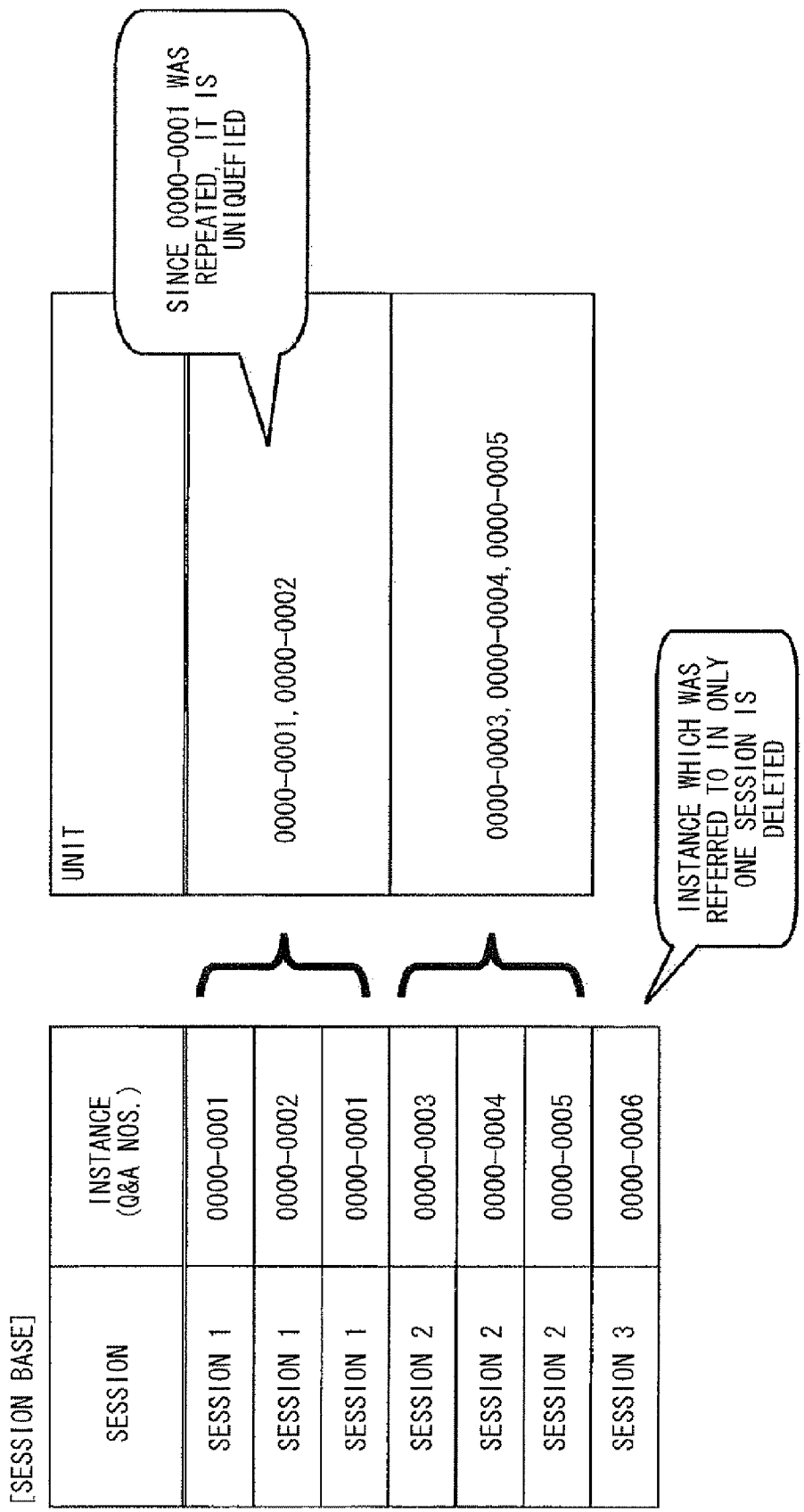
FIG. 12 is a diagram illustrating a unit extraction method of session base in the embodiment.

At operation S103, the unit extraction of the session base is performed. The association unit 21 reads out the access logs for 24 hours before the time of the tantalization, from the database. Incidentally, in the same manner as at operation S101, any instance displayed by selecting a relevant instance link may well be excluded from the tantalization. In addition, the Q&A Nos. of instances referred to in an identical session are extracted from the access logs read out, so as to put the instances together as a unit every session. On this occasion, in a case where an identical instance was referred to a plurality of times in the identical session, the identical instance referred to the plurality of times is unique-field when the instances are put together as the unit (refer to FIG. 12). The units extracted for the respective sessions are once recorded in the RAM 12. Thereafter, the process advances to operation S104.

Figure 13:
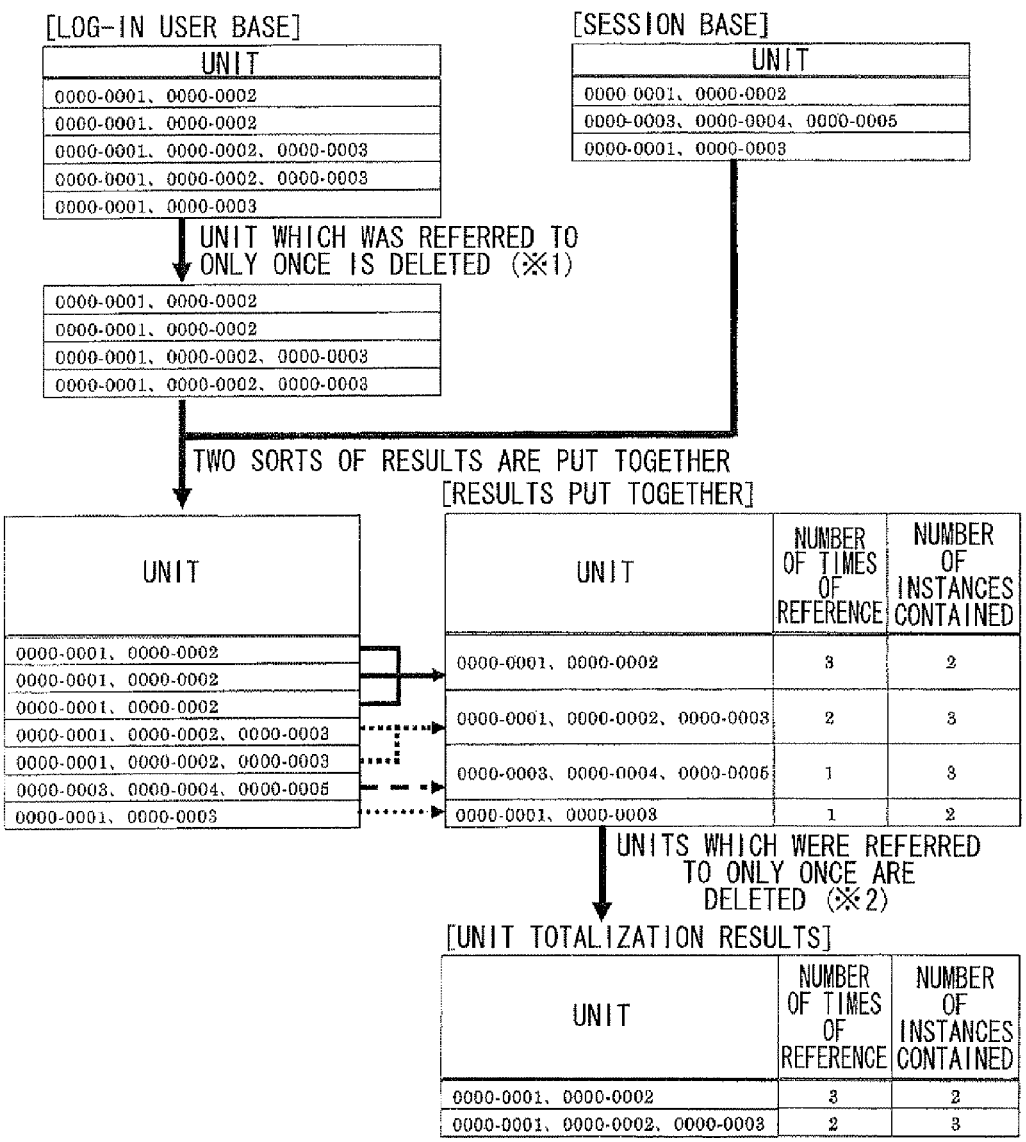
FIG. 13 is a diagram illustrating the flow of the unit creation process in the embodiment, in accordance with the transition of the contents of unit information items.

At operation S104, the unit extraction results of the log-in user base and the unit extraction results of the session base are collectively totaled. The association unit 21 reads out the units extracted at operations S101 and S103, from the RAM 12. The association unit 21 totals the extracted units collectively. Concretely, among the extracted units, the numbers of the units having the identical combinations of the Q&A Nos. are counted, and the counted numbers are recorded as the numbers of reference times in the RAM 12. Besides, the numbers of the Q&A Nos. (Instances) contained in the units are counted, and the counted numbers are recorded as the numbers of contained instances in the RAM 12 (refer to FIG. 13). Thereafter, the process advances to operation S105.

At operation S105, the units which were referred to only once are deleted. The association unit 21 refers to the list of the units totaled at operation S104. The association unit 21 deletes any unit as to which the number of reference times is one, that is, any unit which was referred to by only one user (refer to FIG. 13). The unit which was referred to by only one user is deleted, and the units which were referred to by two or more users are left behind. In this way, the unit of low relevancy as was merely referred to by the identical user accidentally can be prevented from being totaled. Thereafter, the process advances to operation S106.

At operation S106, whether or not at least one unit information item has been obtained is decided. That is the association unit 21 accesses the RAM 12 and decides whether or not there is at least one unit information item obtained by the process down to operation S105. Subject to the decision that there is at least one unit information item, the process advances to operation S107. Subject to the decision that no unit information has been obtained, the process indicated in the flow chart is ended.

At operation S107, the numbers of times of appearance of instances are totaled. The association unit 21 extracts the instances from the unit information obtained at operation S105, and counts how many units each instance appeared in. The counted numbers of times of the instances are temporarily recorded in the RAM 12 as intra-unit instance information for the respective instances. Thereafter, the process advances to operation S108.

Figure 14:
FIG. 14 is a diagram illustrating the configurations of unit information and intra-unit instance information according to the embodiment.

FIG. 14 is a diagram showing the configurations of the unit information and the intra-unit instance information according to this embodiment. The unit information contains information items (here, Q&A Nos.) which indicate the instances constituting the created unit, the number of times of reference of the unit (refer to operation S104), and the number of the instances which are contained in the unit. Besides, the intra-unit instance information holds the number of times of appearance as indicates the number of the units in which each corresponding instance appears.

At operation S108, the obtained information is registered in the database. The association unit 21 registers the unit information obtained by the process of operations S101 to S105, in a unit information table. On this occasion, the association unit 21 sets the valid flags of unit information items registered in the unit information table, to be invalid. The association unit 21 sets the valid flag of the unit information obtained anew, to be valid, whereby the unit information obtained anew is added into the unit information table.

Here, the "valid flag" is a flag which indicates the validity of information for use in a relevant information output process to be stated later. That is, in this embodiment, the past unit information items are accumulated in invalidated states without being erased. Besides, the association unit 21 registers the intra-unit instance information obtained at operation S107, in an intra-unit instance information storage table. On the occasion of the registration here, the intra-unit instance information is the same as in the registration process of the unit information that intra-unit instance information items in the past are not erased, owing to the manipulation of valid flags. Thereafter, the process indicated in the flow chart is ended.

In the relevant information output process to be described below, the information whose valid flag is set to be valid is used. That is, in a case where the database was not updated in the process indicated in the flow chart (the new unit information and intra-unit instance information were not added into the tables), the unit information and intra-unit instance information which were added last, among the past totaled results, are used in the relevant information output process.

Figure 15:
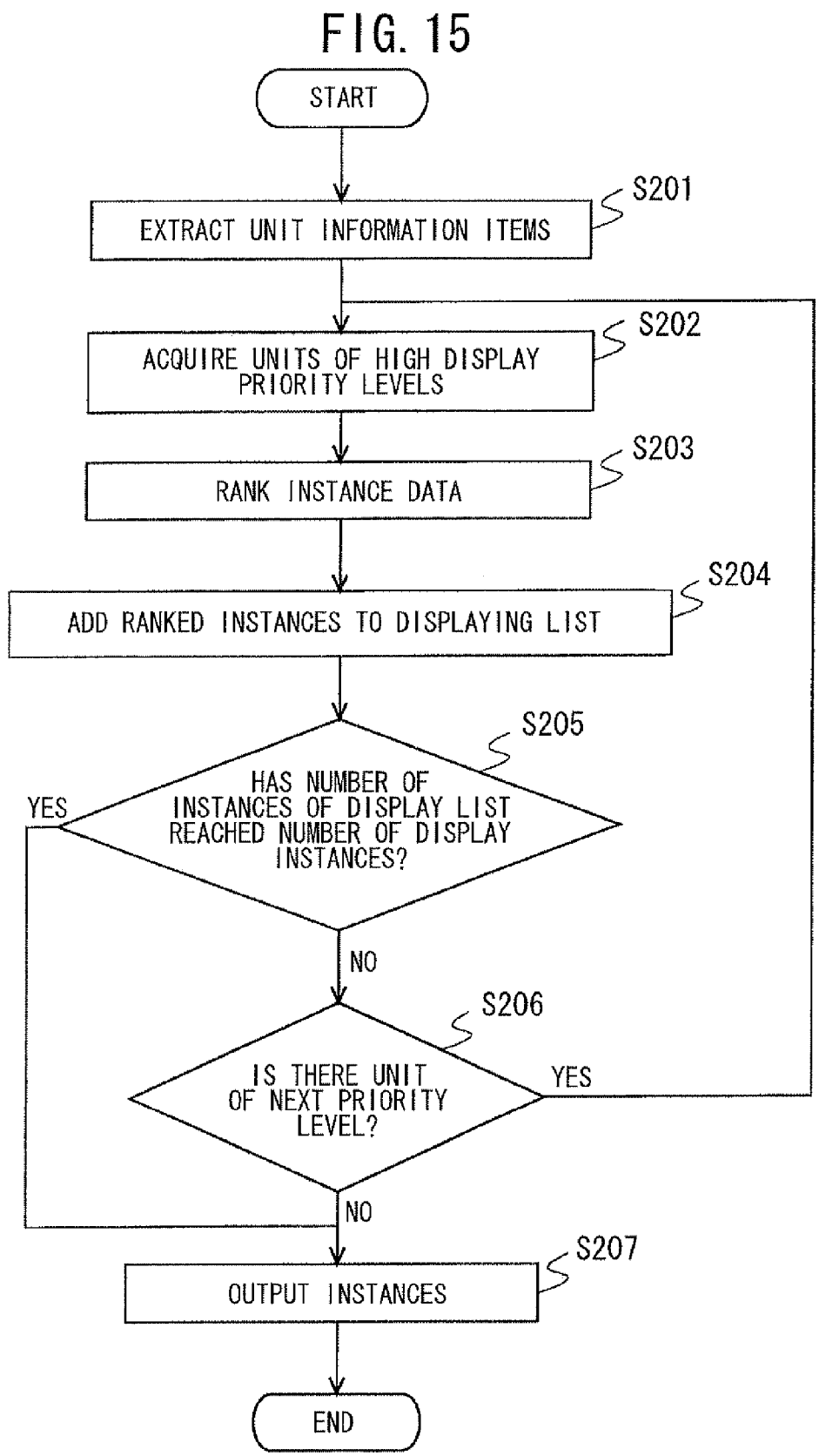
FIG. 15 is a flow chart illustrating the flow of a relevant information output process in the embodiment.

FIG. 15 is a flow chart showing the flow of the relevant information output process in this embodiment. The process indicated in the flow chart is started when triggered by the fact that the user terminal 3 has made a request for the display information of the instance detailed screen through, for example, the user's selection of a link displayed in the user terminal 3.

At operation S201, unit information items are extracted. The information providing unit 22 extracts the unit information items containing an instance requested by the user terminal 3, among unit information items whose valid flags are set to be valid, in the unit information storage table. Thereafter, the process advances to operation S202.

At operation S202, the unit of the highest display priority level is acquired. The priority level setting unit 23 acquires the unit of the highest display priority level in accordance with the predetermined display rules of units. In this embodiment, the unit of the highest display priority level is acquired in such a way that the unit information items extracted at operation S201 are sorted on the basis of the following conditions: In the order of applications, the sorting conditions are (1) the order in which the number of times of reference of the unit is larger, (2) the order in which the number of instances contained in the unit is larger, (3) the order in which the number of times of appearance of the instance contained in the unit is larger, (4) the order in which the reference date and hour of the instance contained in the unit is newer, (5) the ascending order of the largest one of the system ID's of the instance contained in the unit, and (6) the ascending order of the second-largest ID of the system ID's of the instance contained in the unit. Here, the conditions (3), (4), (5) and (6) are decided except the number of times of appearance, the reference date and hour, and the system ID, of the instance complying with the user's request.

Concretely, the unit information items extracted at operation S201 are first sorted in the order in which the number of times of reference of the unit is larger (1). In addition, the unit information items having the same number of times of reference of the unit are sorted in the order in which the number of the instances contained in the unit is larger (2), and the unit information items having the same number of the instances contained in the unit are sorted in the order in which the number of times of appearance of the instance which has the largest number of times of appearance among the instances contained in the unit is larger (3). Thenceforth, the unit information items are sorted in accordance with the sorting conditions (1) to (6) until the unit of the highest display priority level is determined.

At operation S203, the instances are ranked. The priority level setting unit 23 ranks the instances contained in the unit acquired at operation S202, in accordance with instance display rules. In this embodiment, the instances contained in the unit acquired at operation S202 are ranked by being sorted on the basis of the following conditions: In the order of applications, the sorting conditions are (1) the order in which the number of times of appearance is larger, (2) the order in which the reference date and hour of extraction time points are newer, and (3) the ascending order of the system ID's. However, the instances already contained in the displaying list and the instance complying with the user's request are excluded from the ranking. Incidentally, the concrete method of the sorting is substantially the same as the method described as to operation S202, and it shall therefore be omitted from description.

At operation S204, the ranked instances are added to the displaying list. The information providing unit 22 adds the instances to the displaying list in the order of higher ranks, with reference to the instance ranking created at operation S203. On this occasion, the instances up to a predetermined number of display instances (in this embodiment, 5 instances) are added to the display list. Thereafter, the process advances to operation S205.

At operation S205, whether or not the number of the instances of the display list has reached the number of the display instances is decided. The information providing unit 22 decides whether or not the number of the instances has reached the number of the display instances, in such a way that the number of the instances added to the display list down to operation S204 is compared with the preset number of the display instances. In a case where the number of the instances has not reached the number of the display instances, the process advances to operation S206. On the other hand, in a case where the number of the instances has At operation S206, whether or not there is any unit of the next priority level is decided. The information providing unit 22 decides whether or not the unit of the next highest display priority level exists among the units acquired at operation S202. Subject to the decision that there is the unit of the next priority level, the process advances to operation S202. Hereat operation S202, the unit of the highest display priority level next to the unit acquired at the last execution is acquired. That is, the process of operations S202 to S206 is repeated until the instances added to the display list reaches the number of the display instances, or until the instances have been listed up as to all the units extracted at operation S201. Subject to the decision that there is not the unit of the next priority level, the process advances to operation S207.

At operation S207, the instances are outputted. The information providing unit 22 generates display information for displaying the instance detailed screen of the instance requested by the user terminal, in this user terminal 3. On this occasion, the information providing unit 22 adds links to the instances added to the display list by the process down to operation S206, to the display information in order that the links to the relevant instances which are relevant to the requested instance may be displayed in the user terminal 3 simultaneously with the details of the instance requested by the user terminal 3. On this occasion, the links to the relevant instances to be added are added so as to be displayed in the user terminal 3 in such a manner that the links are arrayed in the order of the priority levels of the display list. The generated display information is transmitted to the user terminal 3 through the network 5. The user terminal 3 receives the display information and outputs an image generated on the basis of the received display information, to a display device or the like, thereby to display the instance detailed screen which contains the instance details and the links to the relevant instances (refer to FIG. 5). Thereafter, the process indicated in the flow chart is ended.

The instance details displayed in compliance with the user's request, and the links to the relevant instances are contained in the instance detailed screen which is displayed in the user terminal 3 (refer to FIG. 5). When the user manipulates the user terminal 3 and selects a desired instance from among the links to the relevant instances, he/she can browse the instance detailed screen of the corresponding instance.

Incidentally, the information providing system 1 according to the embodiment has provided relevant information items to users when information items retained remotely are provided to the users, but an information providing system may well provide relevant information items when information items retained locally, such as information items accumulated in the HDD of a user terminal, are provided to a user.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information providing system which provides accumulated information items in compliance with requests, comprising:
   an association unit running on a processor which totals access logs to the information items, in each predetermined access unit, and which associates the plurality of information items accessed in the predetermined access unit, as relevant information items;
   an information providing unit which provides a requested information item when any of the plurality of information items associated by said association unit has been requested, and which simultaneously provides the relevant information items associated with the requested information or an access portion to the other information; and
   a priority level setting unit configured to set a higher priority level to an access unit that contains a larger number of the items than another access unit.

2. An information providing system as defined in claim 1, further comprising:
the priority level setting unit which sets priority levels for the plurality of associated information items, on the basis of the access logs;
wherein said information providing unit preferentially provides the information whose priority level is high, or preferentially provides the access portion to the information whose priority level is high.

3. An information providing system as defined in claim 1, wherein said association unit totals the access logs to the information items, in each user unit, and the association unit associates the plurality of information items accessed by the user, as the relevant information items.

4. An information providing system as defined in claim 1, wherein said association unit totals the access logs to the information items, in each communication session unit, and the association unit associates the plurality of information items accessed in the session, as the relevant information items.

5. An information providing system as defined in claim 1, wherein said association unit associates the plurality of information items whose numbers of times of accesses are larger than a predetermined number of times, as the relevant information items among the plurality of information items accessed in the predetermined access unit.

6. The information providing system as defined in claim 1, wherein the plurality of associated information items are accumulated in the order of extraction of pertinent data, tantalization, and database updating as a large flow.

7. An information providing method which provides accumulated information items in compliance with requests, comprising:
allowing a computer to total access logs to the information items, in each predetermined access unit;
allowing the computer to associate the plurality of information items accessed in the predetermined access unit, as relevant information items;
allowing the computer to provide a requested information item when any of the plurality of associated information items has been requested, and to simultaneously provide the relevant information items associated with the requested information or an access portion to the other information; and
allowing the compute to set a higher priority level to an access unit that contains a larger number of the items than another access unit.

8. An information providing method as defined in claim 7, further comprising:
allowing the computer to set priority levels for the plurality of associated information items, on the basis of the access logs;
wherein the information whose priority level is high is preferentially provided, or the access portion to the information whose priority level is high is preferentially provided.

9. An information providing method as defined in claim 7, wherein the access logs to the information items are totaled in each user unit, and the plurality of information items accessed by the user are associated as the relevant information items.

10. An information providing method as defined in claim 7, wherein the access logs to the information items are totaled in each communication session unit, and the plurality of information items accessed in the session are associated as the relevant information items.

11. An information providing method as defined in claim 7, wherein at the association operation, the plurality of information items whose numbers of times of accesses are larger than a predetermined number of times are associated as the relevant information items among the plurality of information items accessed in the predetermined access unit.

12. The information providing method as defined in claim 7, further comprising:
accumulating the associated information items in the order of extraction of pertinent data, tantalization, and database updating as a large flow.

13. A computer-readable record medium which stores therein an information providing program for providing accumulated information items in compliance with requests, comprising:
totaling access logs to the information items, in each predetermined access unit, and associating the plurality of information items accessed in the predetermined access unit, as relevant information items;
providing a requested information item when any of the plurality of associated information items has been requested;
simultaneously providing the relevant information items associated with the requested information or an access portion to the other information; and
a priority level setting unit configured to set a higher priority level to an access unit that contains larger number of the items than another access unit.

14. The computer-readable record medium as defined in claim 13, further comprising:
accumulating the associated information items in the order of extraction of pertinent data, tantalization, and database updating as a large flow.

* * * * *

UNITED STATES PATENT AND TRADEMARK OFFICE
CERTIFICATE OF CORRECTION

PATENT NO. : 8,190,603 B2
APPLICATION NO. : 12/196816
DATED : May 29, 2012
INVENTOR(S) : Daisuke Morita Page 1 of 1

It is certified that error appears in the above-identified patent and that said Letters Patent is hereby corrected as shown below:

Column 11, Line 3, in Claim 2, after "unit" delete "which".

Signed and Sealed this
Twenty-eighth Day of August, 2012

David J. Kappos
*Director of the United States Patent and Trademark Office*